United States Patent
Hedayat et al.

(10) Patent No.: US 12,445,231 B2
(45) Date of Patent: *Oct. 14, 2025

(54) GRANT-FREE UPLINK TRANSMISSIONS

(71) Applicant: InterDigital Patent holdings, Inc., Wilmington, DE (US)

(72) Inventors: Ahmad Reza Hedayat, Aliso Viejo, CA (US); Shahrokh Nayeb Nazar, San Diego, CA (US); Oghenekome Oteri, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,039

(22) Filed: Nov. 7, 2022

(65) Prior Publication Data

US 2023/0061275 A1    Mar. 2, 2023

Related U.S. Application Data

(63) Continuation of application No. 16/764,547, filed as application No. PCT/US2018/061228 on Nov. 15, 2018, now Pat. No. 11,533,137.

(Continued)

(51) Int. Cl.
*H04W 74/0816* (2024.01)
*H04L 1/1812* (2023.01)
*H04L 1/1867* (2023.01)

(52) U.S. Cl.
CPC .......... *H04L 1/1887* (2013.01); *H04L 1/1819* (2013.01); *H04L 1/1896* (2013.01); *H04W 74/0816* (2013.01)

(58) Field of Classification Search
None
See application file for complete search history.

(56) References Cited

U.S. PATENT DOCUMENTS 11,533,137 B2 * 12/2022 Hedayat ................ H04L 1/1896
2011/0269490 A1   11/2011 Earnshaw et al.
(Continued)

FOREIGN PATENT DOCUMENTS

JP    2017063274 A    3/2017

OTHER PUBLICATIONS

3rd Generation Partnership Project (3GPP), "Discussion on UCI feedback for URLLC", R1-1717094, Huawei, HiSilicon, Meeting #90bis, Prague, Czech Republic, Oct. 9-13, 2017, 5 pages.

(Continued)

*Primary Examiner* — Anh Vu H Ly
(74) *Attorney, Agent, or Firm* — Flaster Greenberg, P.C.

(57) ABSTRACT

A wireless transmit receive unit (WTRU) may send a grant free transmission comprising a first and a second part, each of which may be associated with a priority. The first part's priority may be higher than the second part's priority. The WTRU may select a first back of value from a first range of back off values. The WTRU may determine whether the grant free transmission was successful. If the grant free transmission was not successful, the WTRU may send a retransmission of the grant free transmission, which may include the first part and may not include the second part. The retransmission may select a second back off value from a second range of back off values, which may be a larger than the first range of back off values. The second back off value may indicate the number of grant free resource to skip prior to sending the retransmission.

18 Claims, 8 Drawing Sheets

Related U.S. Application Data

(60) Provisional application No. 62/586,473, filed on Nov. 15, 2017.

(56) References Cited

U.S. PATENT DOCUMENTS

| | | | |
|---|---|---|---|
| 2014/0219202 A1 | 8/2014 | Kim et al. | |
| 2015/0208404 A1* | 7/2015 | Yie | H04L 1/1861 370/329 |
| 2015/0327243 A1* | 11/2015 | Yin | H04L 5/0053 370/329 |
| 2018/0020447 A1* | 1/2018 | Thubert | H04W 72/0446 |
| 2018/0176945 A1 | 6/2018 | Cao et al. | |
| 2018/0212718 A1 | 7/2018 | Takeda et al. | |
| 2018/0367255 A1 | 12/2018 | Jeon et al. | |
| 2019/0037586 A1 | 1/2019 | Park et al. | |
| 2019/0132104 A1* | 5/2019 | Lee | H04L 1/1664 |
| 2020/0037314 A1 | 1/2020 | Xiong et al. | |
| 2020/0045722 A1 | 2/2020 | Bae et al. | |
| 2020/0092910 A1* | 3/2020 | Takeda | H04W 72/02 |

OTHER PUBLICATIONS

3rd Generation Partnership Project (3GPP), R1-1609801, "Discussion on Grant-Free Transmission based on Sensing", ZTE, 3GPP TSG RAN WG1 Meeting #86bis, Lisbon, Portugal, Oct. 10-14, 2016, 4 pages.

3rd Generation Partnership Project (3GPP), R1-167206, "HARQ Timing Relationships for Grant-Free Transmission", Huawei, HiSilicon, 3GPP TSG RAN WG1 Meeting #86, Gothenburg, Sweden, Aug. 22-26, 2016, 2 pages.

R1-1713956, "HARQ-ACK Timing", NTT Docomo, Inc. ,3GPP TSG RAN WG1 Meeting #90 Prague, Czechia, Aug. 21-25, 2017, 5 pages.

R1-1717396, "UL Data Transmission Procedures in NR", Intel Corporation, 3GPP TSG RAN WG1 Meeting 90bis Prague, Czech Republic, Oct. 9-13, 2017, 12 pages.

* cited by examiner

GRANT-FREE UPLINK TRANSMISSIONS

CROSS REFERENCE

This application is a continuation of U.S. Non-Provisional patent application Ser. No. 16/764,547, filed May 15, 2020, which is the National Stage Entry under 35 U.S.C. § 371 of Patent Cooperation Treaty Application No. PCT/US2018/061228, filed Nov. 15, 2018, which claims priority of U.S. Provisional Patent Application No. 62/586,473, filed Nov. 15, 2017, the contents of all of which are hereby incorporated by reference herein in their entireties.

BACKGROUND

In wireless communication systems, a central node may serve one or more wireless transmit/receive units (WTRUs). When a central node serves one or more WTRUs, the opportunity to send transport blocks (TB) to the central node may be administered by the central node. For example, the central node may schedule a WTRU uplink (UL) transmission.

SUMMARY

A wireless transmit receive unit (WTRU) may be configured to send grant free transmissions on grant free resources. The WTRU may send a first grant free transmission that comprises a first part and a second part. The first part and the second part may each be associated with a priority. The priority associated with the first part may be a higher priority than the priority associated with the second part. For example, the first part may include acknowledgement information (e.g., hybrid automatic repeat request (HARQ)) and the second part may include channel quality information (CQI). The WTRU may select a first back off value for the first grant free transmission from a first range of back off values. The WTRU may determine whether the first grant free transmission was successful. If the first grant free transmission was not successful, the WTRU may send a retransmission of the first grant free transmission. The retransmission may include the first part and may not include the second part. The WTRU may select a second back off value for the retransmission from a second range of back off values. The second range of back off values may be a larger range than the first range of back off values. The second range of back off values may indicate the number of grant free resource to skip prior to sending the retransmission.

Multiplexing may be used on the first grant free transmission and/or the retransmission of the first grant free transmission. The first grant free transmission may be multiplexed on a transport block using a first redundancy version. The retransmission may be multiplexed on another transport block using a second redundancy version. The second redundancy version may be associated with a higher redundancy than the first redundancy version.

BRIEF DESCRIPTION OF THE DRAWINGS

A more detailed understanding may be had from the following description, given by way of examples in conjunction with the accompanying drawings wherein.

DETAILED DESCRIPTION

A detailed description, which may include illustrative embodiments, will now be described with reference to the various Figures. Although this detailed description may provide detailed examples of possible implementations, it should be noted that the details are intended to be exemplary and in no way limit the scope of the application.

Figure 1A:
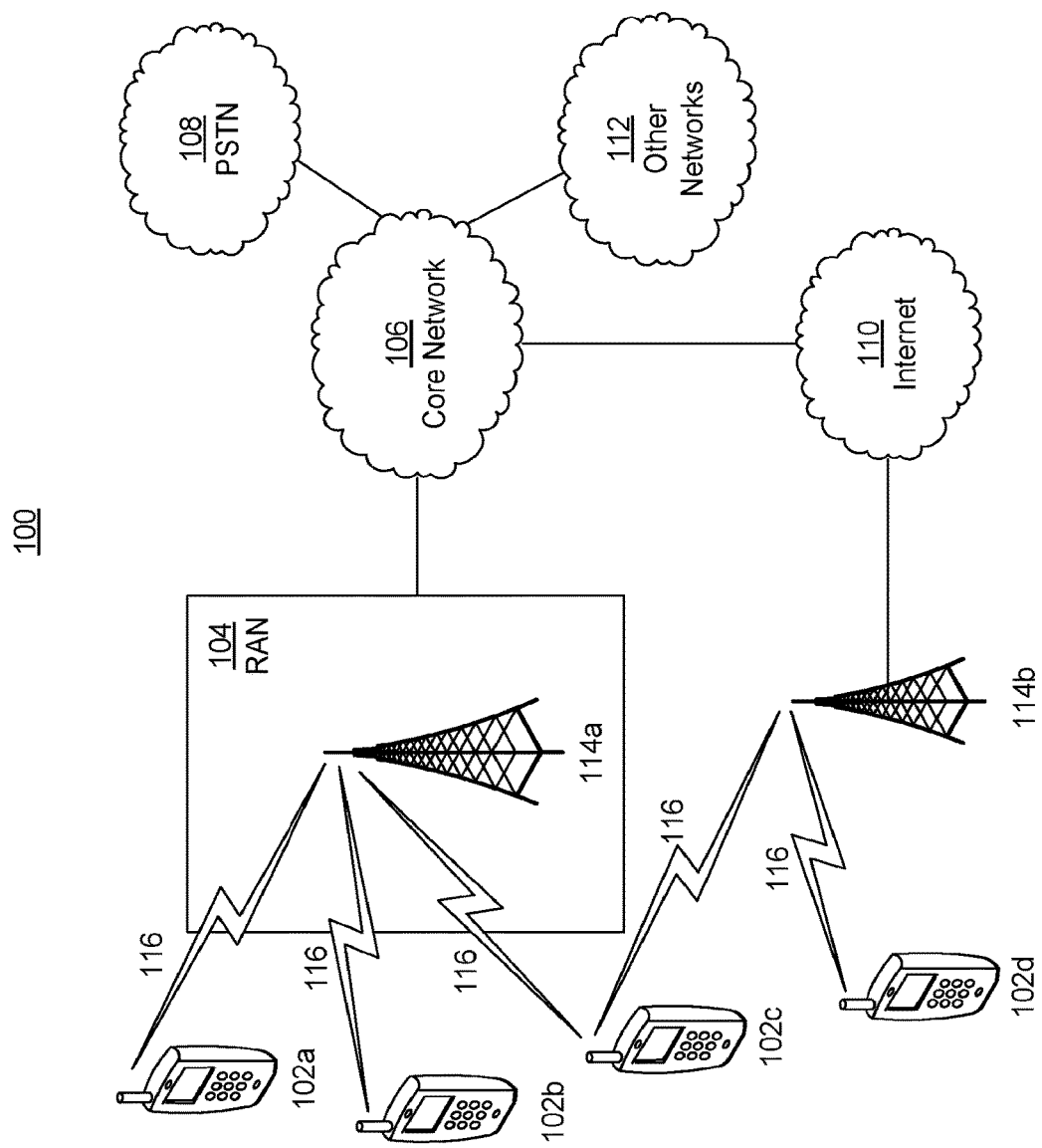
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

The base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
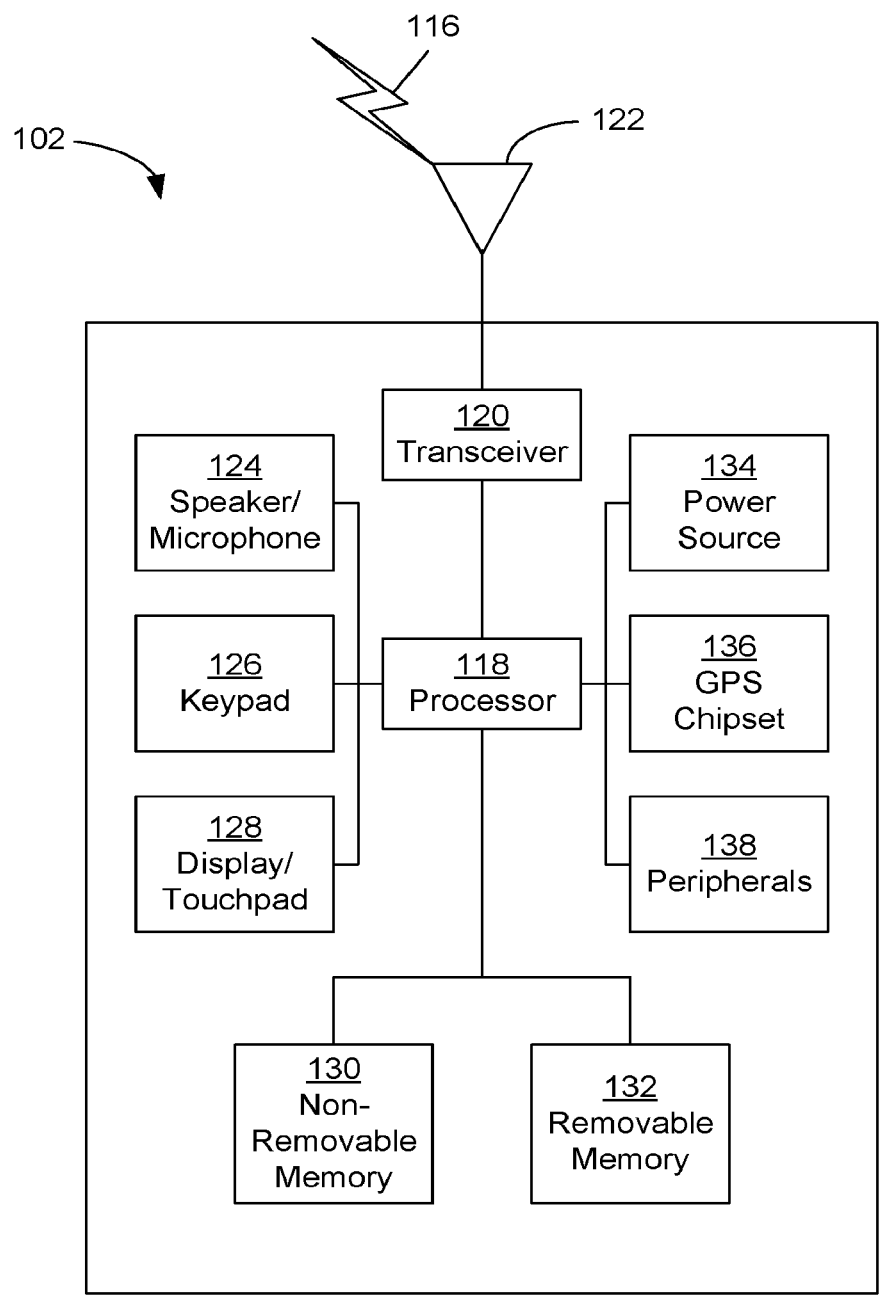
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
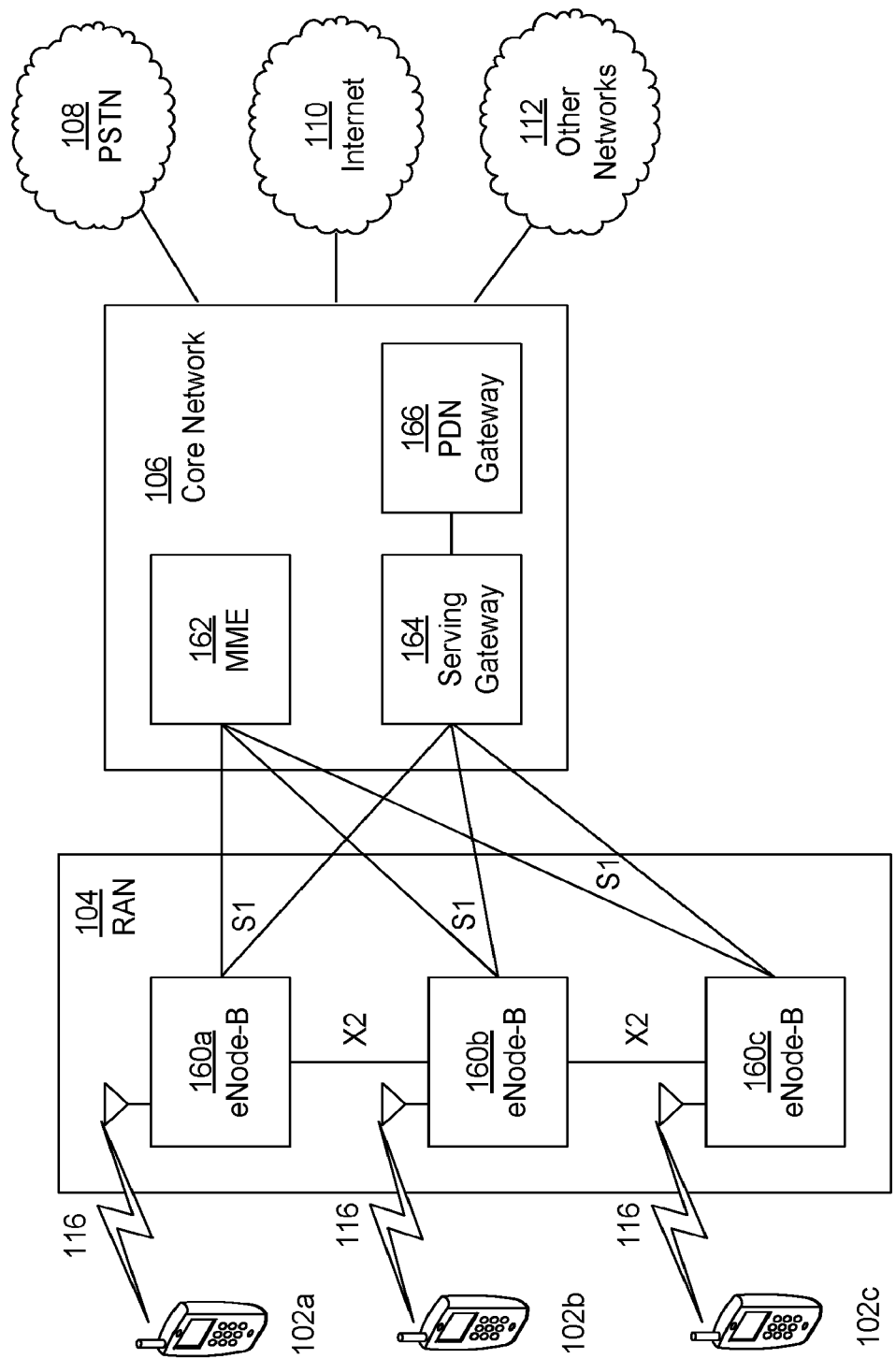
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
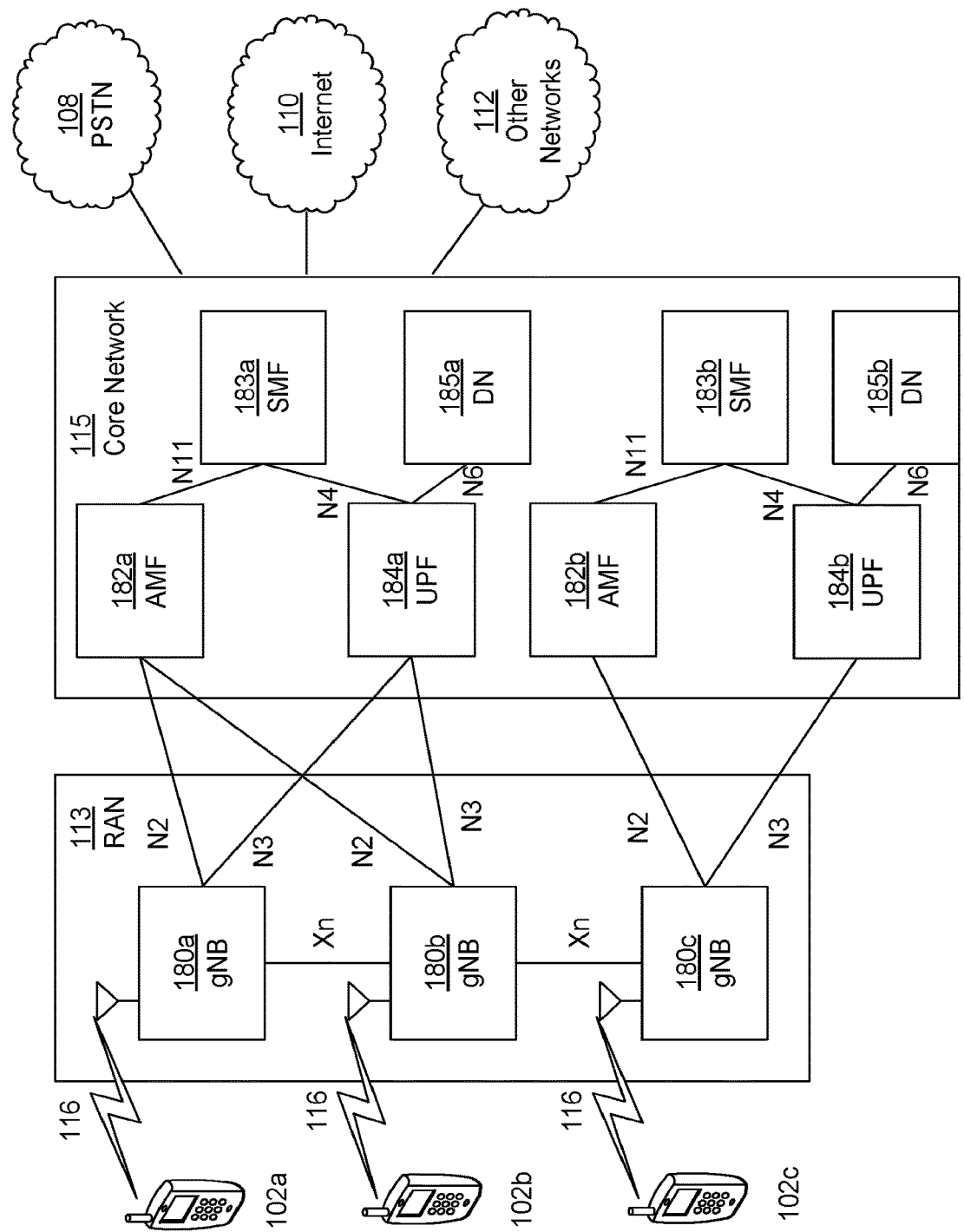
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Although the features and elements described herein consider LTE, LTE-A, New Radio (NR), and/or 5G specific protocols, it should be understood that the features and elements described herein are not restricted to LTE, LTE-A, New Radio (NR), and/or 5G specific protocols and may be applicable to other wireless systems.

In wireless communication systems, a central node (e.g., a gNodeB) may serve one or more WTRUs. When a central node serves one or more WTRUs, the opportunity to send transport blocks (TBs) to the central node may be administered by the central node. For example, a gNodeB (gNB) may schedule a WTRU uplink (UL) transmission by assigning time-frequency resources (e.g., separate time-frequency resources) to one or more WTRUs (e.g., each WTRU) and/or granting one or more resources (e.g., each resource) to a WTRU. Such arrangement for UL transmission may be referred to as grant-based UL transmission.

A gNB may broadcast the presence of one or more time-frequency resources and/or allow one or more WTRUs (e.g., a set of WTRUs) to compete for the resources (e.g., each resource), and/or allow access to the resources without an UL grant (e.g., a specific UL grant). Such arrangement (e.g., in New Radio (NR)) for UL transmission may be referred to as grant-free (GF) UL transmission, or an UL transmission without grant. The application of GF UL transmission may be in ultra-reliable low-latency communication (URLLC), massive machine-type communication (mMTC or MMTC), and/or enhanced mobile broadband (eMBB or EMBB) communication. MMTC may enable communication between a large number of low-cost and power-constrained (e.g., battery-driven) devices intended to support applications (e.g., smart metering, logistics, and/or field and body sensors). URLLC may enable devices and/or machines to reliably (e.g., ultra-reliably) communicate with very low latency and/or high availability. Enabling devices and/or machines to communicate with ultra-reliability, very low latency, and/or high availability may enable URLLC to provide vehicular communication, industrial control, factory automation, remote surgery, smart grids, and/or public safety applications. EMBB may provide enhancements to one or more (e.g., a variety) of parameters (e.g., data rate, delay, and coverage) of mobile broadband access.

GF UL transmission may be performed. One or more of the following may apply. A gNB may specify GF resources (e.g., via radio resource control (RRC) signaling). The GF resources may be WTRU-specific or may be WTRU-independent. A WTRU may pick a GF resource and/or send a TB on the GF resource. If the WTRU does not receive (e.g., after a period of time) a hybrid automatic repeat request acknowledgment (HARQ-ACK) (e.g., the corresponding HARQ-ACK for a TB), the WTRU may retransmit the TB (e.g., may plan to retransmit the TB). The WTRU may retransmit the TB on another GF resource and/or on a granted resource (e.g., if the gNB grants a resource). The WTRU may retransmit using GF resources, for example, until a max number of retries is reached.

In a GF UL transmission, a TB may be transmitted (e.g., transmitted K times) across consecutive resources (e.g., K consecutive GF resources). Such transmissions may be referred to as GF transmissions with K repetitions. For a GF UL transmission (e.g., for a TB transmission with K repetitions), the repetitions may follow a redundancy-version (RV) sequence that may be configured by WTRU-specific RRC signaling (e.g., to be a previously known sequence). An RV sequence may include a sequence of redundancy version values used by a WTRU. In examples, a RV sequence may include a sequence of one or more repeated redundancy versions (e.g., four repetitions of a redundancy version of 0, such as, [0,0,0,0]). In examples, a RV sequence may include a sequence of one or more redundancy versions where the first and third redundancy version values are 0 and the second and fourth are with redundancy version values are 3 (e.g., [0,3,0,3]).

There may be an inefficiency in a (e.g., each) GF UL transmission, for example. The inefficiency may be due to the nature of GF transmission and/or may depend on the number of WTRUs attempting to use a (e.g., each) GF resource.

Depending on the application (e.g., URLLC or mMTC) for which the GF operation is used, there may be a chance (e.g., a low chance or a high chance) of a collision among the WTRUs attempting to access a GF resource. The higher the number of attempting WTRUs, the higher the chance of collision and/or the lower the overall efficiency. The chance of a collision among the attempting WTRUs may be lowered.

A WTRU may multiplex Uplink Control Information (UCI) with the TB (e.g., the TB that the WTRU attempts to send using a GF resource). The behavior of a WTRU, for example, after performing the GF operation, may be used to determine whether the gNB received (e.g., successfully received) the UCI.

One or more types of GF transmissions (e.g., in NR) may be performed. A gNB may specify GF resources using one or more of the following. A gNB may specify a GF resource via a Radio Resource Control (RRC) configuration (e.g., reconfiguration) without L1 signaling (e.g., Type 1). A gNB may specify a GF resource via RRC configuration with L1 signaling (e.g., Type 2). A gNB may specify a GF resource via RRC configuration with L1 signaling (e.g., that may modify one or more RRC-configured parameters) (e.g., Type 3).

A grant-free (GF) resource may be selected by one or more WTRUs. For example, a WTRU selecting a GF resource from one or more (e.g., a set of) GF resources may perform an UL GF transmission. One or more of the following may apply. A WTRU may receive a HARQ-NACK for a TB that has been sent (e.g., previously sent) via a GF operation. The WTRU may not receive a HARQ-ACK or a HARQ-NACK for a TB transmission that has been sent. The WTRU may attempt to send the same TB (e.g., resend the same TB) or another TB (e.g., if the WTRU receives a HARQ-NACK, or the WTRU does not receive a HARQ-NACK or HARQ-ACK). The WTRU may choose the next resource for the UL GF transmission. A WTRU may attempt) to send the UL GF transmission on a GF resources that other WTRUs are also attempting to transmit on, such as in mMTC applications, which may increase the chance of a collision among the WTRUs.

The WTRU may retransmit a pending TB on a GF resource (e.g., the next immediately available GF resource). For example, the WTRU may retransmit the pending TB on the next immediately available GF resource (e.g., because doing so may lower the potential delay). If two or more WTRUs (e.g., all WTRUs) that have collided during the previous GF resource (e.g., which may lead to HARQ-NACK or DRX) retransmit their pending TB on the next (e.g., immediately next) GF resource(s), the chance of another collision may increase.

Figure 2:
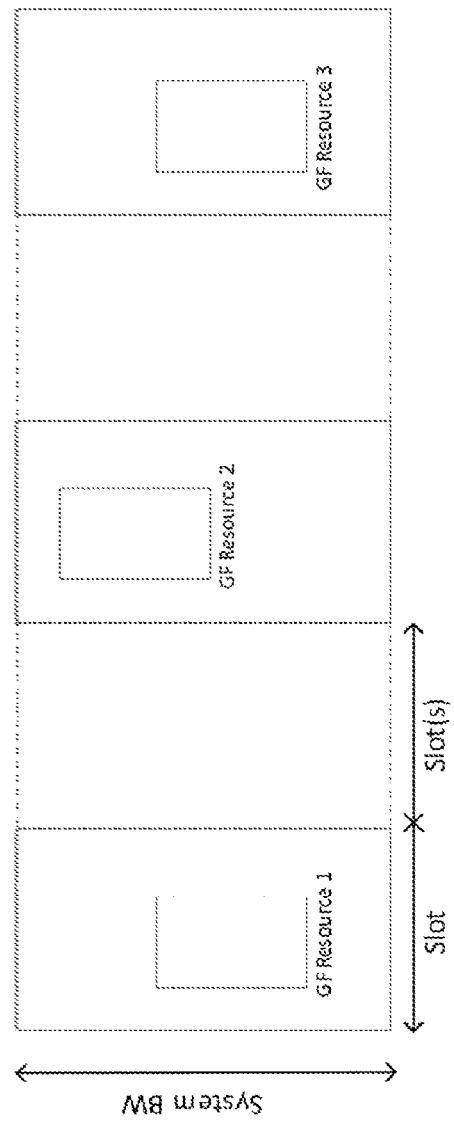
FIG. 2 shows an example of scheduled grant-free (GF) resources during slots.

An opportunistic resource selection for a GF retransmission may be performed. An example of an opportunistic resource selection for GF retransmission is shown in FIG. 2. For example, as shown in FIG. 2, if a GF transmission by a WTRU is unsuccessful, the WTRU may choose an upcoming GF resource to retransmit its pending TB. One or more (e.g., two) WTRUs may attempt to send their pending TB on GF resource 1 in FIG. 2. A gNB may be unsuccessful in decoding the TBs (e.g., any of the TBs), for example, due to a collision. The gNB may be unable to identify which WTRUs have used the GF resource 1. The gNB may be unable to send HARQ feedback to the WTRUs. A WTRU may determine to retransmit the pending TB on the next available (e.g., next immediately available) GF resource (e.g., GF resource 2), for example, because doing so would lower the delay (e.g., potential delay). If a WTRU determines to retransmit the pending TB on the next available (e.g., next immediately available) GF resource, there may be a low (e.g., no) chance of a collision. If two or more (e.g., all) WTRUs that have collided during the previous GF resource 1 retransmit their pending TB on the same resource, there may be an increase in the chance of a collision.

The WTRU may not retransmit on one or more subsequent GF resources (e.g., one or more immediately subsequent GF resources) and/or may retransmit the pending TB in an opportunistic manner (e.g., to lower the chance of collision). The WTRU may back off from retransmission, for example, by skipping a random number of GF resources (e.g., a back off value) before initiating a retransmission. Backing off for a random number of GF resources may lead to distributing the attempting WTRUs over a longer period, for example, because the random number may be chosen from a pre-defined range (e.g., range of back off values) and/or may be derived (e.g., drawn) according to a probability (e.g., non-deterministically) such that the chance of two or more WTRUs deriving (e.g., drawing) the same random number (e.g., the same back off value) is minimal. For example, the back off counter (e.g., back off value) may be derived (e.g., drawn) uniformly from a pre-defined range (e.g., 0 to $T_1$). As $T_1$ becomes larger (e.g., as the back off range becomes larger), the chance of a collision (e.g., another collision) may be lowered, for example, among the contending WTRUs. For example, if $T_1=3$, two WTRUs (e.g., two WTRUs that have collided in a previous attempt to transmit during a given GF resource) may be more likely (e.g., more likely than if $T_1=1$) to derive (e.g., draw) different back off values from a range (e.g., a range of back off values that includes 0, 1, 2, 3) and/or may be more likely to send on separate GF resources. The two WTRUs may derive (e.g., draw) the same number (e.g., back off value) from the range (e.g., a range of back off values that includes 0, 1, 2, 3). If the derived (e.g., drawn) numbers are the same (e.g., the back off values are the same), the two WTRUs may transmit (e.g., retransmit) on the same GF resource, for example, which may lead to a (e.g., another) collision. If the transmission (e.g., retransmission) fails (e.g., also fails), a next GF resource for transmission may be chosen (e.g., chosen again). The next GF resource for transmission may be chosen randomly from a range (e.g., 0 to $T_2$) that may be wider (e.g., larger) than the previous range (e.g., $T_2$ may be $2 \times T_1+1$). For example, if $T_1=3$, then $T_2=7$, where a WTRU (e.g., each WTRU) of the two or more WTRUs that have collided in the previous GF UL transmission may derive (e.g., draw) a back off value randomly with a uniform distribution from a range (e.g., a range of back off values that includes 0, 1, 2, 3, 4, 5, 6, 7). The range of the back off values may increase. As the range of back off values increases, the likelihood that different back off counters are derived (e.g., drawn) by contending WTRUs and/or the likelihood that separate GF resources are used by the contending WTRUs to send a transmission (e.g., subsequently send a transmission) may increase. As described herein, a backoff range may be referred to as contention window size (CWS).

A WTRU may initiate GF transmission or retransmission, for example, by deriving (e.g., drawing) a back off value (e.g., denoted by t) from a range of back off values (e.g., from $T_0$ to $T_i$), skipping resources (e.g., skipping the next t−1 GF resources), and/or transmitting/retransmitting on a resource (e.g., the $t^{th}$ GF resource). $T_0$ may be equal to 0 (e.g., the first transmission may have a zero back off counter), $T_1$ may be equal to 3, and $T_i$ may be equal to $2 \times T_{i-1}+1)-1)$. (e.g., leading to $T_2=7$, $T_3=15$, etc.). A non-zero back off counter may be used for $T_0$, for example, for the first transmission (e.g., $T_0=3$, and $T_1=2 \times T_0+1$, which may lead to $T_0=3$, $T_1=7$, $T_2=15$, etc.). An example may include a coefficient, which may double the back off value range (e.g., after a collision). The increase may be performed with a different coefficient (e.g., 3, which may triple the back off value range), for example, such that $T_1=3 \times (T_{i-1}+1)-1)$. The back off value range may increase, for example, to lower the chance of another collision among two or more contending WTRUs. The sequence of $T_i$ values may be pre-defined for WTRUs (e.g., some or all WTRUs), or may be communicated via RRC signaling, etc. A WTRU (e.g., each WTRU) may pick (e.g., may randomly pick) the $T_i$ value according to whether it is transmitting for the first time, retransmitting for the first time, retransmitting for the second time, etc. (e.g., such that the backoff range may be different for first transmission, first retransmission, second retransmission, etc.). The sequence of $T_i$ values may be provided to each WTRU via WTRU-specific RRC signaling and the sequence of one WTRU may be different from another WTRU, e.g., depending on the priority given to each WTRU (e.g., WTRUs running low-latency applications may be prioritized over WTRUs running MMTC applications).

The values of $T_0$, $T_1$, $T_2$, etc., and/or the probability that a value is derived (e.g., drawn) from may be predefined (e.g., predefined in the specification) and/or may be signaled (e.g., signaled by RRC). The gNB may customize the parameters (e.g., the parameters that indicate the values of $T_0$, $T_1$, $T_2$, etc. and/or the probability that a value is derived), for example, according to the deployment and/or application.

A WTRU (e.g., each WTRU) may priori select (e.g., or be granted) a random sub-set of the grant free resources available for transmission that may be unique to the WTRU (e.g., each WTRU). A grant free resource may be selected for transmission by a WTRU. The WTRU may select the grant free resource without receiving a unique and/or explicit grant from a gNB. For example, rather than the gNB allocating a set of resources to WTRUs (e.g., all the grant free WTRUs), a WTRU (e.g., each WTRU) may priori select (e.g., or be granted) a random sub-set of the grant free resources available for transmission. The sub-set of grant free resources may be unique to the WTRU (e.g., each WTRU). Upon failure of an initial transmission, the WTRU may send a retransmission on a resource (e.g., the next uniquely available grant free resource from the sub-set of grant free resources). The randomization of the WTRU specific grant free resource (e.g., the sub-set of grant free resources unique to the WTRU) may reduce the probability that a collision occurs between subsequent transmissions of the transmitting WTRUs.

It may be determined whether a GF transmission is successful or unsuccessful. When a WTRU sends a TB to a gNB (e.g., the WTRU's gNB), the WTRU may receive an HARQ-ACK or HARQ-NACK, for example, after the transmission (e.g., in response to the transmission). The timing between an UL transmission and the corresponding HARQ feedback (e.g., expected to be sent by the gNB to the WTRU) may be expressed by a parameter that may be obtained from one or more fields in the DCI, or may be configured by an RRC parameter.

In GF UL transmission, the WTRU may not receive or may not detect a HARQ-ACK or a HARQ-NACK (e.g., due to the collision of two or more transmissions by WTRUs transmitting on the same GF resource). After a certain time (e.g., an acknowledgment time), the WTRU may determine that a previously sent TB was not received by the gNB and/or may attempt to retransmit the TB using a GF resource (e.g., the next available GF resource). For GF UL transmission, the timing between a GF UL transmission and the expected HARQ feedback may be expressed by a parameter (e.g., an acknowledgement time) that may be carried in one or more fields in the DCI or may be specified by RRC.

One or more WTRUs may attempt to use GF resources (e.g., available GF resources) in one or more (e.g., a few) consecutive slots. If WTRUs (e.g., all WTRUs) wait for the same duration of time before determining that the previous GF transmission was unsuccessful, the WTRUs (e.g., all the WTRUs) may target the same GF resource for transmission (e.g., the next immediately available GF resource), for example, to perform a retransmission. A fixed time duration for WTRUs (e.g., all WTRUs) to determine whether a previous GF transmission is unsuccessful may lead to a higher chance of a collision on the next GF resource used for transmission. A WTRU may use a corresponding time duration (e.g., waiting time) that is different from another WTRU. Such a varying waiting time may distribute the retransmission attempts by the WTRUs, for example, over a range of two or more (e.g., several) GF resources and/or over two or more (e.g., several) slots. In a GF UL transmission, the timing between a GF UL transmission and a time (e.g., a maximum time) that the corresponding HARQ feedback is to be received (e.g., is expected to be received) may be expressed by a parameter (e.g., that may be carried in one or more fields in the DCI and/or specified by a WTRU-specific RRC). Such time interval may be different from a WTRU and another WTRU. The gNB may define the time interval. For example, the gNB may assign a time duration to one or more WTRU (e.g., each WTRU). This may be a gNB directed method. The gNB may specify a range of time from which the WTRU may pick (e.g., may randomly pick) a value and/or may choose the value to be the timing between a GF UL transmission and maximum time that the corresponding HARQ feedback is to be received (e.g., is expected to be received). The gNB specifying the range of time and/or choosing the value may be WTRU autonomous (e.g., more WTRU autonomous). The WTRU may provide feedback of (e.g., may need to provide feedback of) the value to the gNB. Feeding back the value to the gNB may reduce the amount of grant free blind decoding, for example, when the gNB is able to identify the WTRU and not decode the payload.

The range of time intervals may be determined by parameters (e.g., the traffic class). For example, low latency traffic may have a smaller range and/or latency tolerant traffic may have a larger range. A WTRU may have a range (e.g., a single range) that may be determined based on the WTRU application type (e.g., the range for URLLC application type<the range of a eMBB application type<the range for a mMTC application type). A WTRU may have two or more (e.g., multiple) ranges that may be selected based on the type of traffic to be sent.

One or more GF resources may be sensed, for example, to reduce collisions. In GF UL transmissions, one or more WTRUs may attempt to send their pending TB on the same GF resource. For example, one or more WTRUs may attempt to send their pending TB on the same GF resource because the GF resources may be up for grabs by one or more WTRUs (e.g., any WTRU) that is configured to perform GF UL transmission. An attempt by multiple WTRUs to use the same GF resources may cause a collision among the WTRUs (e.g., unsuccessful transmissions), for example, which may lead to none of the TB of the WTRUs being decoded (e.g., being decoded successfully). WTRUs may avoid such collisions, for example, by sensing the resource (e.g., the GF resource) to find out whether another WTRU is using the resource, for example, before attempting to send their pending TB during the same GF resource.

Figure 3:
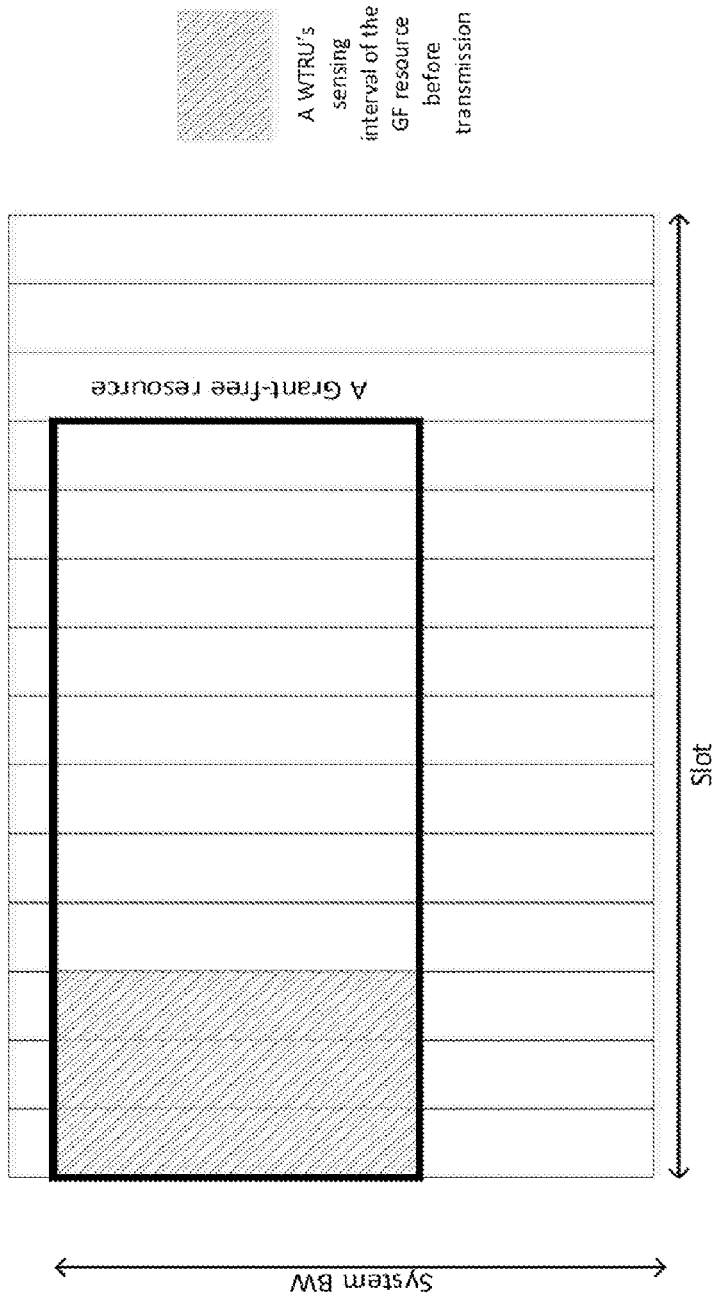
FIG. 3 shows an example grant-free resource scheduled within a slot (e.g., scheduled within a slot by a gNodeB (gNB))

One or more time-domain GF resources may be sensed. A WTRU (e.g., each WTRU) that attempts to use a GF resource may choose a beginning portion of the resource to perform resource sensing, for example, to find out an availability of the resource. If no use of the resource is detected (e.g., if the WTRU determines that no other WTRU is using the resource), the WTRU may decide to send its pending TB on the remaining portion of the GF resource (e.g., after processing). Sensing the medium may include performing energy detection (ED), for example, during the sensing portion. FIG. 3 shows an example where the attempting WTRU senses the first symbols of the GF resource (e.g., the first three symbols of the GF resource). In order to benefit from such behavior, an attempting WTRU (e.g., each attempting WTRU) may choose a sensing interval that may be different from the sensing interval of another attempting WTRU. For example, a WTRU may determine to sense the availability of the grant-free resource during the WTRU's first few OFDM symbols (e.g., first three symbols as in FIG. 3) and/or throughout the bandwidth of the grant-free resource. If it is detected that no other WTRU is using the resource (e.g., using energy-detection), the WTRU may determine to send the WTRU's pending TB on the remaining portion of the GF resource, for example, after processing.

Figure 4:
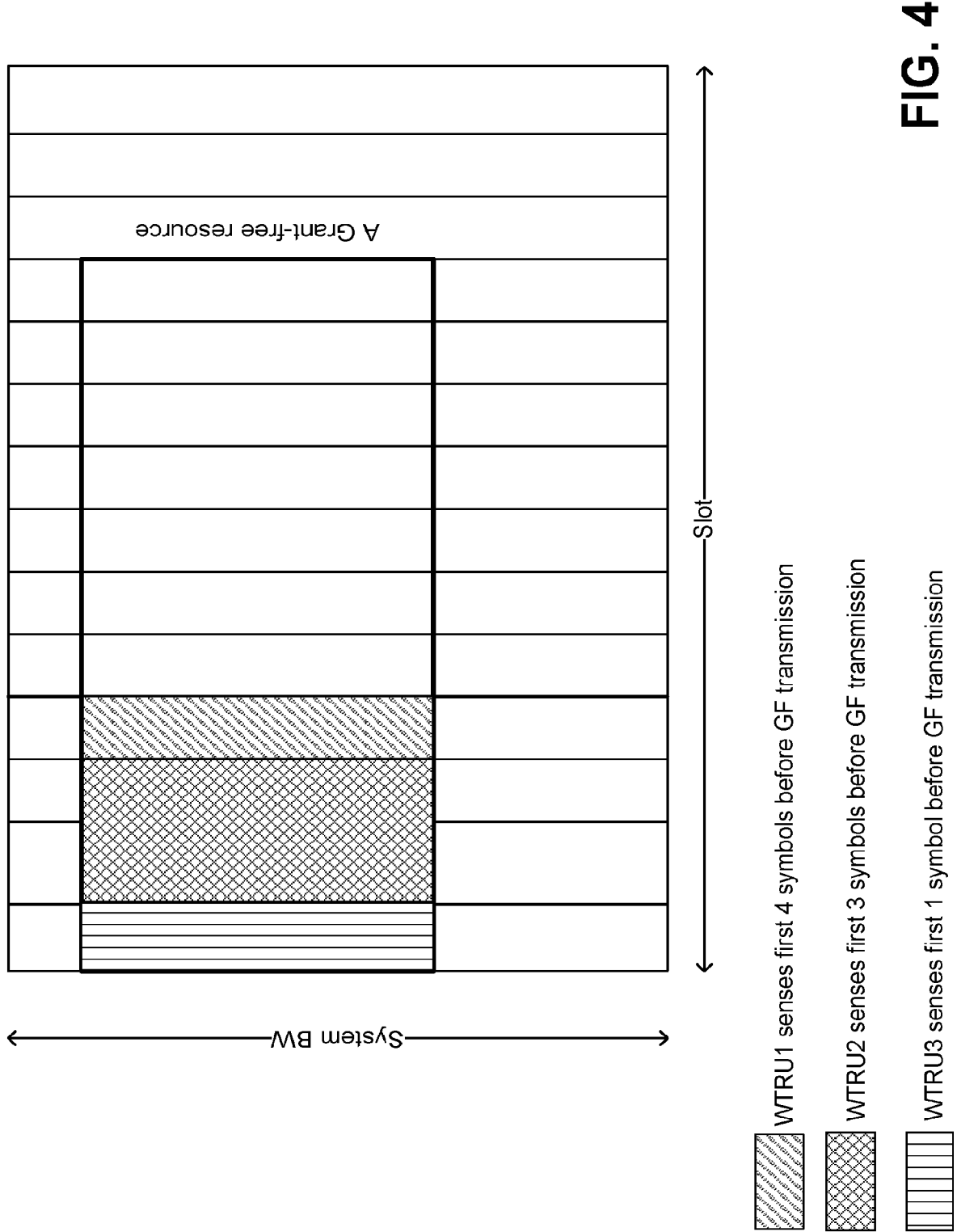
FIG. 4 shows an example grant-free resource scheduled within a slot (e.g., scheduled within a slot by a gNB) and three wireless transmit-receive unit (WTRU) attempts to use the resource for the WTRU's pending transport block (TB)

A WTRU (e.g., each WTRU) may choose a number (e.g., a random number) of symbols, for example, that may be derived (e.g., drawn) using a priori known probability distribution. For example, WTRUs (e.g., all attempting WTRUs) may derive (e.g., draw) a number (e.g., a random number) uniformly from a range (e.g., 0, 1, 2, 3, 4) and/or may perform the resource sensing during the derived number of symbols and/or throughout the bandwidth of the GF resource. FIG. 4 shows an example where three WTRUs attempt to use a grant-free resource and the WTRUs (e.g., each WTRU) uniformly derive (e.g., draws) a value (e.g., a single value) from a priori-known range (e.g., 0, 1, 2, 3, 4). Referring to FIG. 4 one or more of the following may apply. A sensing interval for WTRU1 may be 4 symbols, a sensing interval for WTRU2 may be 3 symbols, and/or a sensing interval for WTRU3 may be 1 symbol. The three WTRUs may pseudo-randomly (e.g., according to a distribution) derive (e.g., draw) a number n from a priori-known range (e.g., 0, 1, 2, 3, 4) and/or may sense the availability of the resource during the first n symbols and throughout the bandwidth of the grant-free resource. WTRU1 may sense the medium during the first four OFDM symbols of the GF resource. WTRU2 may sense the medium during the first three OFDM symbols of the GF resource. WTRU3 may sense the medium during the first OFDM symbol of the GF resource. WTRU3 may be the first WTRU that finds the medium is available and/or may attempt to send the WTRU's pending TB, for example, on the remaining portion of the GF resource (e.g., after processing). WTRU1 and WTRU2 (e.g., after sensing the medium for the duration that is expected) may determine that the GF resource is in use and/or may refrain from using the GF resource. Two or more WTRUs may derive (e.g., draw) the same number and/or may sense the resource for the same duration, which may lead to collision among the WTRUs. The chance for such outcome decreases as the resource sensing range increases.

Two or more WTRUs may attempt to use a GF resource (e.g., the same GF resource). WTRU3 may not attempt to use the GF resource (e.g., may not perform the resource sensing). WTRU2 and WTRU1 may sense the medium. For example, WTRU2 may be the first WTRU that determines that the medium is available and/or may send (e.g., attempt to send) the WTRU's pending TB at the remaining portion of the resource (e.g., after processing). WTRU1 (e.g., after sensing the medium for the duration (e.g., the expected duration)) may determine that the GF resource is in use and/or may refrain from using the GF resource. If neither WTRU3 nor WTRU2 attempt to use the GF resource (e.g., do not perform the resource sensing), the WTRU1 (e.g., after completion of its sensing period) may determine that the GF resource is not in use and/or may transmit its pending TB.

Depending on the sensing performed (e.g., energy detection) and/or the accuracy of sensing performed by a WTRU (e.g., each WTRU), the WTRU may determine earlier (e.g., earlier than the end of its sensing interval) that the GF resource is in use and/or may stop sensing the resource. For example, depending on the sensing and/or the accuracy of the sensing performed by a WTRU, the WTRU may fail to sense the medium is in use and/or may attempt to use the resource, which may cause a collision.

Figure 5:
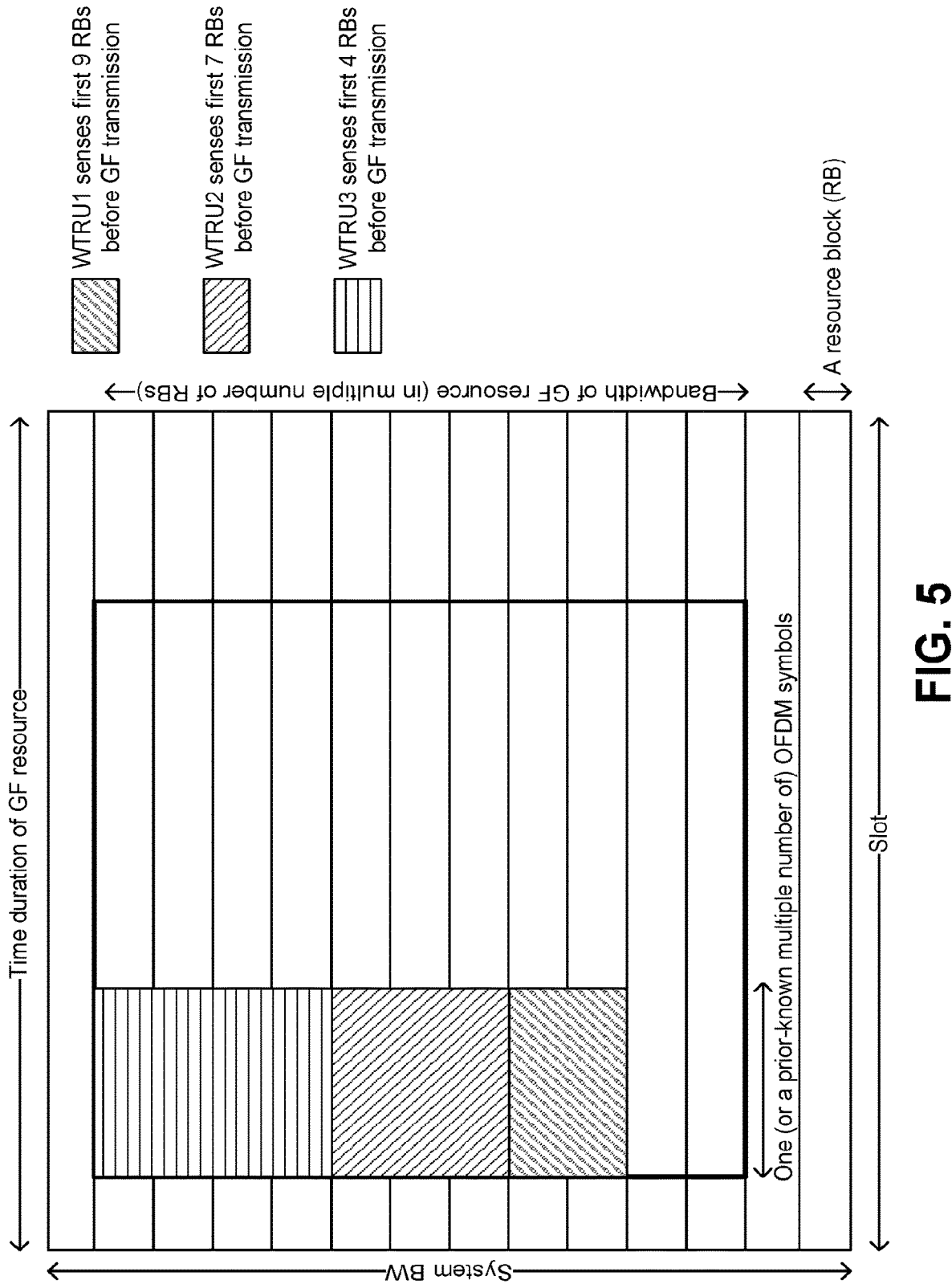
FIG. 5 shows an example grant-free resource scheduled within a slot (e.g., scheduled within a slot by a gNB) and three WTRU attempts to use the resource for the WTRU's pending TB.

One or more frequency-domain GF resources may be sensed. A WTRU may perform (e.g., may consistently perform) resource sensing for the same number of OFDM symbols (e.g., one OFDM symbol and/or a priori known few OFDM symbols) and/or for a variable number of resource blocks (RB). FIG. 5 shows an example where three WTRUs attempt to use a given grant-free resource and/or a WTRU (e.g., each WTRU) uniformly derives (e.g., draws) a value (e.g., a single value) from a priori-known range. As illustrated in FIG. 5, WTRU1, WTRU2, and WTRU3 may perform resource sensing on the same number of OFDM symbols but for a different number of RBs. Referring to FIG. 5, one or more of the following may apply. A sensing interval for WTRU1 may be 9 RBs (e.g., before a GF transmission). A sensing interval for WTRU2 may be 7 RBs (e.g., before a GF transmission). A sensing interval for WTRU3 may be 4 RBs (e.g., before a GF transmission). The three WTRUs may pseudo-randomly derive (e.g., draw) (e.g., per a distribution) a number n from a priori-known range and/or may sense the availability of the resource during the top n RBs of the first OFDM symbol (e.g., or a priori-known first few OFDM symbols). WTRU1 may sense the medium during the top 9 RBs of the GF resource. WTRU2 may sense the medium during the top 7 RBs of the GF resource WTRU3 may sense the medium during the top 4 RBs of the GF resource. WTRU3 may be the first WTRU that finds the medium is available and/or may attempt to send the WTRU's pending TB on the remaining portion of the resource, for example, after processing. WTRU1 and WTRU2 (e.g., after sensing the medium for the duration that is respectively expected) may determine that the GF resource is in use and/or may refrain from using the GF resource. The range that a WTRU (e.g., each WTRU) derives (e.g., draws) the WTRU's sensing period from may be a priori known (e.g., communicated via a parameter by RRC or DCI). The range may be obtained (e.g., may implicitly be obtained) by a WTRU (e.g., each WTRU) as a function of the bandwidth of the GF resource. For example, the range may be the bandwidth of the GF resource represented by the number of RBs associated with the GF resource. FIG. 5 shows an example in which the range includes (0, 1, 2, 3, 4, 5, 6, 7, 8, 9, 11). The range may be implicitly obtained from the bandwidth of the GF resource which is 11 RBs.

Two or more WTRUs may attempt to use a GF resource (e.g., the same GF resource). WTRU3 may not attempt to use the GF resource (e.g., may not be performing the resource sensing). WTRU2 and WTRU1 may be sensing the medium. WTRU2 may be the first WTRU that determines that the medium is available and/or may attempt to send the WTRU's pending TB at the remaining portion of the resource (e.g., after processing). WTRU1 (e.g., after sensing the medium for the duration (e.g., the expected duration)) may determine that the GF resource is in use and/or may refrain from using the GF resource. If neither WTRU3 nor WTRU2 attempt to use the GF resource (e.g., do not perform the resource sensing), the WTRU1 (e.g., after completion of its sensing period) may determine that the GF resource is not in use and/or may transmit its pending TB.

A two-dimensional time-frequency GF resource may be sensed. A WTRU may perform the resource sensing for a variable number (e.g., derived pseudo-randomly from a priori known time-interval) of OFDM symbols (e.g., first OFDM symbols) of the GF resource and/or for a variable number (e.g., derived pseudo-randomly from a priori known RB-interval) of top resource blocks. For example, a time-interval may be (0, 1, 2) and/or a RB-interval may be (0, 1, 2, 3, 4). The WTRU may derive (e.g., draw) a number pseudo-randomly from the time-interval, which may be the time duration of the sensing interval. The WTRU may derive (e.g., draw) a number pseudo-randomly from the RB-interval, which may be the frequency bandwidth of the sensing interval. If the WTRU determines the resource is not in use (e.g., using energy-detection) during the sensing interval, the WTRU may send the WTRU's pending TB, for example, at the remaining portion of the GF resource after processing. A set of resource sensing areas may be priori known by one or more WTRU(s) (e.g., all WTRUs) and/or a WTRU may pseudo-randomly select an area to perform resource sensing. A resource sensing area may include rectangular time and frequency interval, such as (t, f) where t may be in units of OFDM symbol and/or f may be in units of RBs.

The resource sensing areas in FIG. 3 may include one or more of the following. t may be pseudo-randomly derived (e.g., drawn) by a WTRU from a priori distribution. t may be different for two or more WTRUs. For example, a WTRU attempting to use the GF resource may have a t that may be different from another WTRU. f may be fixed for one or more (e.g., all) WTRUs attempting to use the GF resource (e.g., f may be equal to the bandwidth of the GF resource, for example, all the RBs of the GF resource).

The resource sensing areas in FIG. 4 may include one or more of the following. f may be pseudo-randomly derived (e.g., drawn) by a WTRU from a priori distribution and/or f may be one or more RBs. f may be different in two or more WTRUs. For example, a WTRU attempting to use the GF resource may have an f that may be different from an f in another WTRU. t may be fixed for WTRUs (e.g., all WTRUs) attempting to use the GF resource (e.g., t may be equal to one or more OFDM symbols).

The sensing areas may be 2-D time-frequency areas, for example, where the sensing area for a WTRU may differ from another WTRU in time and/or frequency domain. A set of sensing areas may be a priori known by one or more WTRU(s) (e.g., all WTRUs (e.g., $(t_i, f_i)$ for one or more (e.g., all) the sensing areas is a priori identified by gNB and/or known to one or more (e.g., all) WTRUs). The WTRU may select a sensing area from the set. The set of sensing areas may be designed and/or may be nested. A smallest sensing area may be a subset of one or more sensing areas (e.g., all other sensing areas). A second smallest sensing area may be a subset of one or more other sensing areas (e.g., all other sensing areas besides the smallest sensing area), etc. The structure (e.g., the nested structure) of the sensing areas may allow for the determination (e.g., an unambiguous inference) of whether the resource is in use. For example, a fixed payload size carrying the sensing areas in the format of a bitmap may be used to indicate sensing areas within the GF resource. The two-dimensional bitmap may indicate one or more frequency-time areas/partitions within the GF resource.

The resource sensing may be performed in time-domain and/or RB-domain, for example, according to a sensing interval, which may be pseudo-randomly derived (e.g., drawn) from a priori-known distribution. One or more WTRUs may be prioritized to use a minimum sensing interval (e.g., performing no resource sensing). For example, a WTRU that is configured for low-latency applications may be configured by RRC to perform no sensing (e.g., as if the WTRU's sensing interval is zero) and/or the WTRU may attempt to use a GF resource without sensing. WTRUs (e.g., WTRUs that perform latency-tolerant applications, such as mMTC) may be configured to perform resource sensing. A WTRU with a certain application (e.g., a low-latency application) may get a higher priority, for example, compared to other WTRUs. The priori range that WTRU's derive (e.g., draw) a number from (e.g., pseudo-randomly derive a number from) may start from a non-zero number, for example, to prioritize the high-priority WTRUs. Prioritization may be performed based on or more criteria. In examples, the prioritization may be based on applications performed by a WTRU (e.g., low-latency vs mMTC applications).

For resource sensing, the number of resource elements (REs) from the GF resource that a WTRU uses for transmission of a TB may be variable and/or may not be known in advance (e.g., due to the sensing interval). The sensing interval may be a number that is pseudo-randomly derived. One or more of the following may apply (e.g., which may address the lack of knowledge).

The WTRU may prepare the TB, for example, as if there is no resource sensing. If the WTRU determines that the GF resource is not in use (e.g., after performing the resource sensing), the WTRU may rate match the prepared TB and/or send the rate-matched TB.

Where the outcome of the sensing interval is a few symbols (e.g., a sensing interval that leads to a few medium sensing interval), the WTRU may prepare the pending TB with various rate-matching assumptions. The various rate-matching assumptions of the TB may be based on an outcome. For example, a sensing range may be (0, 2, 4) and a WTRU may pseudo-randomly derive (e.g., draw) 0, 2, or 4. Before using the GF resource, the WTRU may rate-match WTRU's pending TB, e.g., for possible sensing interval outcomes. One or more of the following may apply. The WTRU may prepare a rate-matched TB as if there is no sensing (e.g., corresponding to an outcome of 0 derived for the sensing interval). The WTRU may prepare a rate-matched TB with the remaining REs as if the sensing interval is 2. The WTRU may prepare a rate-matched TB with the remaining REs as if the sensing interval is 4. When the WTRU approaches the GF resource and/or pseudo-randomly derives (e.g., draws) from the range (0, 2, 4), the WTRU may have the rate-matched TB for an outcome ready.

The gNB may determine (e.g., uniquely determine) the rate-matching value, for example, because the gNB may know what portion of the GF resource has not been used (e.g., what was not used by the WTRU for resource sensing). The gNB may obtain (e.g., implicitly obtain or determine) the size of the resource sensing area (e.g., the number of OFDM symbols for the whole bandwidth of the GF resource, the number of RBs for a number (e.g., fixed number) of OFDM symbols, and/or the number of OFDM symbols and number of RBs). The gNB may obtain (e.g., subsequently obtain or determine) the portion of the resource that was used for transmission of the WTRU's TB and/or obtain (e.g., subsequently obtain or determine) the associated rate-matching ratio.

The WTRU may be configured with one or more of offset values by RRC signaling wherein a (e.g., each) offset value may be used by the WTRU to compute the amount of REs for the corresponding sensing range. The WTRU may consider the UL waveforms (e.g., OFDM vs. DFT-s-OFDM) and/or different UCI multiplexing mechanisms, for example, for determining the offset values.

The WTRU may be configured to perform resource sensing on the first few symbols of a slot, e.g. on the first OFDM symbol, or the first two OFDM symbols. If the WTRU is configured to perform resource sensing on the first few symbols of a slot, the WTRU may determine (e.g., implicitly determine) the first OFDM symbol within the slot available for UL GF transmission (e.g., the remaining portion of the GF resource -PUSCH- by the WTRU). For example, if the WTRU is performing the resource sensing during the first M OFDM symbols, the WTRU may determine that the GF PUSCH may be transmitted in the next K symbols (M+1, M+2, . . . , M+K) OFDM symbol. K may be a parameter, for example, in terms of the number of OFDM symbol(s), which may depend on the WTRU capability. For example, for a WTRU with high capability K=1 (e.g., which may indicate the WTRU may transmit the UL GF PUSCH in the very next OFDM symbol after performing resource sensing). The WTRU may follow the slot-format configuration indicated in the slot format indicator (SFI) for the remaining symbols of the slot.

UCI multiplexing may be performed during GF transmission. A WTRU may take advantage of a grant-based resource and/or may multiplex UCI, for example, including Channel State Information (CSI), Channel Quality Indicator (CQI), Rank Indicator (RI), and/or the HARQ ACK/NACK information along the TB. The behavior of a WTRU may change during a GF transmission, for example, when the WTRU attempts to multiplex UCI information on the PUSCH.

An adaptive coding rate may be performed for UCI multiplexing. The processing performed by the WTRU (e.g., required to be performed by the WTRU) during UCI multiplexing may be agnostic of whether the UL transmission is grant-based or grant-free. The processing used for UCI multiplexing may be used during GF UL transmission. For GF transmission, the GF resource may be subject to interference and/or a collision. To address higher interference during the GF UL transmission, the redundancy-version (RV) may be adjusted and/or the TB may be rate-matched, for example, so that the multiplexed UCI may be encoded with a lower-rate coding. In GF UL transmission with K repetitions (e.g., where a UCI is multiplexed with a TB), the UCI info may be multiplexed using a lower rate code (e.g., compared to the previous transmission in the sequence of K transmissions). A lower rate code may be associated with a higher amount of redundancy. In a GF transmission with K repetitions, the UCI may be encoded with a lower-rate code in the second repetition, for example, compared to the first repetition. The UCI may be encoded with a lower-rate code in the third repetition, for example, compared to the second repetition, etc. To ensure that the gNB is aware of the coding rate used by the WTRU, a set of predefined rate matching/coding rate parameters may be specified, for example, wherein the WTRU may use the set of predefined rate matching/coding rate parameters sequentially during the TB (re)transmission with K repetitions. For example, the WTRU may follow a coding rate sequence, which may be configured by WTRU-specific RRC signaling to be {½, ⅓, ¼}. The WTRU may use a different beta-offset value for a (re)transmission (e.g., each (re)transmission), for example, to compute the amount of REs for a (e.g., each) respective UCI to be multiplexed during GF UL (re)transmissions. For example, the WTRU may follow a beta-offset sequence which may be configured by WTRU-specific RRC signaling to be $\{\beta_{\mathit{offset},0}^{\mathit{HARQ-ACK}}, \beta_{\mathit{offset},1}^{\mathit{HARQ-ACK}}, \beta_{\mathit{offset},2}^{\mathit{HARQ-ACK}}\}$. The beta-offset for the first transmission may be smaller than the beta-offset for the second transmission, etc.

The WTRU may wait for the HARQ feedback of the WTRU's GF UL transmission (e.g., for a waiting time). While the WTRU is waiting for the HARQ feedback of its GF UL transmission, if a PUCCH resource is assigned to the WTRU, the WTRU may retransmit the UCI (e.g., regardless of whether the prior GF UL transmission was successful). If a collision happens during the GF transmission of the TB with multiplexed UCI, the WTRU may receive a HARQ-NACK or may not receive HARQ feedback. The multiplexed-UCI may not be received by the gNB and/or may be retransmitted (e.g., in an upcoming PUCCH opportunity, if any; multiplexed by a grant-based PUSCH resource; and/or retransmitted in another GF transmission).

Priority based UCI multiplexing may be performed. If the transmission of a UCI (e.g., HARQ ACK) by the WTRU has a higher priority than the GF transmission (e.g., for a given slot), the WTRU may drop the GF transmission (e.g., CSI or CQI) on PUSCH and/or may send the HARQ-ACK (e.g., only the HARQ-ACK) in the PUCCH. The WTRU may initiate (e.g., immediately initiate) the GF transmission on the grant free resource on PUSCH in the following slot. If the transmission of a UCI (e.g., periodic/semi-persistent CSI reports) by the WTRU has a lower priority than the GF data transmission (e.g., for a given slot), the WTRU may drop the periodic/semi-persistent CSI reports and/or proceed with the GF transmission of data on PUSCH and/or multiplex the periodic/semi-persistent CSI reports with the data and transmit on the GF resource on PUSCH. If the WTRU has dropped the UCI, the WTRU may continue with the transmission of the periodic/semi-persistent CSI reports in the next allocated PUCCH resource. The gNB may determine (e.g., blindly determine) the WTRU behavior, for example, by detecting (e.g., simultaneously detecting) PUCCH and/or the GF PUSCH resources. If the gNB detects PUSCH (e.g., while expecting UCI transmission by the WTRU on the PUCCH) the gNB may determine that the WTRU is multiplexing the UCI with the data and/or transmitting the UCI and the data on the GF resources on PUSCH.

The priority of the UCI transmissions may be configured by RRC. For example, the WTRU may determine that the WTRU is to (e.g., needs to) multiplex the HARQ-ACK with the data, for example, on a GF resource and/or not drop the HARQ-ACK if a predefined parameter (e.g., simultaneousAckNackAndData) provided by higher layers is set TRUE. The WTRU may determine that the WRTU is to drop (e.g., needs to drop) periodic/semi-persistent CSI report(s) and/or not multiplex CSI report(s) with the data on the GF resource, for example, if a predefined parameter (e.g., simultaneous-CSIAndData) provided by higher layers is not set TRUE.

UCI multiplexing may be conditioned on the HARQ feedback. If for the initial transmission, the WTRU has multiplexed the UCI with data and/or transmitted on the GF UL resource and/or receives NACK from the gNB, the WTRU may not have a good coverage and/or neither the UCI nor the TB may have successfully been detected at the gNB. The WTRU may determine (e.g., autonomously determine) to drop the UCI and/or data for the GF retransmissions/repetitions, for example, according to the priority of the UCI contents. If the WTRU drops the UCI, the code rate for the GF TB retransmissions may be lowered, for example, which may result in a higher chance of successful detection of the TB at the gNB. If the WTRU drops the data, the UCI transmission by the WTRU may be on the PUCCH, for example, which may have a higher probability of detection at the gNB.

If for the initial transmission, the WTRU multiplexed the UCI with data and/or transmitted on the GF UL resource and/or receives ACK from the gNB, the WTRU may have a good coverage and UCI and/or TB may have been detected (e.g., successfully been detected) at the gNB. The WTRU may determine (e.g., autonomously determine) to multiplex the UCI, for example, with data for the GF retransmissions/repetitions (e.g., regardless of the priority of the UCI contents). The WTRU may not drop a UCI and/or may multiplex (e.g., always multiplex) UCI with data in the consequent GF retransmissions/repetitions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a wireless transmit/receive unit (WTRU), the method comprising:
   receiving a radio resource control (RRC) message, wherein the RRC message comprises:
   information indicating physical uplink shared channel (PUSCH) resources for the WTRU, and
   at least one priority indication;
   determining that uplink control information is to be transmitted during a time period that at least partially overlaps with a transmission opportunity associated with the PUSCH resources in a first slot, wherein a transport block associated with the PUSCH resources is to be transmitted in the transmission opportunity;
   determining that the uplink control information has a higher priority than the transmission opportunity associated with the PUSCH resources in the first slot based on the at least one priority indication in the RRC message;
   transmitting the uplink control information via a physical uplink control channel (PUCCH) transmission during the time period in the first slot; and
   transmitting the transport block associated with the PUSCH resources in a second slot based on a repetition indication in the RRC message, wherein a hybrid automatic repeat request (HARQ) acknowledgement (ACK) is multiplexed on the PUSCH resources in the second slot based on a parameter in the RRC message being set, wherein the second slot is immediately subsequent to the first slot.

2. The method of claim 1, wherein the uplink control information comprises a hybrid automatic repeat request (HARQ) acknowledgement (ACK).

3. The method of claim 1, further comprising:
determining that second uplink control information is to be transmitted during a second time period that at least partially overlaps with a second transmission opportunity, wherein a second transport block associated with the PUSCH resources is to be transmitted in the second transmission opportunity;
determining that the second uplink control information does not have a higher priority than the second transport block associated with the PUSCH resources; and
determining whether the second uplink control information is allowed to be multiplexed on the PUSCH resources.

4. The method of claim 3, further comprising transmitting the second transport block and the second uplink control information on a condition that the second uplink control information is allowed to be multiplexed with data on the PUSCH resources.

5. A wireless transmit/receive unit (WTRU) comprising a memory and a processor, the processor and memory configured to:
receive a radio resource control (RRC) message, wherein the RRC message comprises:
information indicating physical uplink shared channel (PUSCH) resources for the WTRU, and
at least one priority indication;
determine that uplink control information is to be transmitted during a time period that at least partially overlaps with a transmission opportunity associated with the PUSCH resources in a first slot, wherein a transport block associated with the PUSCH resources is to be transmitted in the transmission opportunity;
determine that the uplink control information has a higher priority than the transmission opportunity associated with the PUSCH resources in the first slot based on the at least one priority indication in the RRC message;
transmit the uplink control information via a physical uplink control channel (PUCCH) transmission during the time period in the first slot; and
transmit the transport block associated with the PUSCH resources in a second slot based on a repetition indication in the RRC message, wherein a hybrid automatic repeat request (HARQ) acknowledgement (ACK) is multiplexed on the PUSCH resources in the second slot based on a parameter in the RRC message being set, wherein the second slot is immediately subsequent to the first slot.

6. The WTRU of claim 5, wherein the uplink control information comprises a hybrid automatic repeat request (HARQ) acknowledgement (ACK).

7. The WTRU of claim 5, wherein the processor and the memory are further configured to:
determine that second uplink control information is to be transmitted during a second time period that at least partially overlaps with a second transmission opportunity, wherein a second transport block associated with the PUSCH resources is to be transmitted in the second transmission opportunity;
determine that the second uplink control information does not have a higher priority than the second transport block associated with the PUSCH resources; and
determine whether the second uplink control information is allowed to be multiplexed on the PUSCH resources.

8. The WTRU of claim 7, wherein the processor and the memory are further configured to transmit the second transport block and the second uplink control information on a condition that the second uplink control information is allowed to be multiplexed with data on the PUSCH resources.

9. The method of claim 3, further comprising:
transmitting the second uplink control information via a second PUCCH transmission on a condition that the second uplink control information is not allowed to be multiplexed with data on the PUSCH resources.

10. The method of claim 3, further comprising receiving an indication that indicates whether the second uplink control information is allowed to be multiplexed with data on the PUSCH resources.

11. The method of claim 10, wherein the indication is received via a radio resource control (RRC) message.

12. The method of claim 1, wherein the WTRU transmits the uplink control information via the PUCCH transmission during the time period in the first slot based on determining that the uplink control information has a higher priority than the transmission opportunity associated with the PUSCH resources in the first slot.

13. The method of claim 1, wherein the WTRU transmits the transport block associated with the PUSCH resources in the second slot based on determining that the uplink control information has a higher priority than the transmission opportunity associated with the PUSCH resources in the first slot.

14. The WTRU of claim 7, wherein the processor and the memory are further configured to transmit the second uplink control information via a second PUCCH transmission on a condition that the second uplink control information is not allowed to be multiplexed with data on the PUSCH resources.

15. The WTRU of claim 7, wherein the processor and the memory are further configured to receive an indication that indicates whether the second uplink control information is allowed to be multiplexed with data on the PUSCH resources.

16. The WTRU of claim 15, wherein the indication is received via a radio resource control (RRC) message.

17. The WTRU of claim 5, wherein the processor and the memory are further configured to transmit the uplink control information via the PUCCH transmission during the time period in the first slot based on determining that the uplink control information has a higher priority than the transmission opportunity associated with the PUSCH resources in the first slot.

18. The WTRU of claim 5, wherein the processor and the memory are further configured to transmit the transport block associated with the PUSCH resources in the second slot based on determining that the uplink control information has a higher priority than the transmission opportunity associated with the PUSCH resources in the first slot.

* * * * *